United States Patent [19]

Huizinga

[11] Patent Number: 5,010,231
[45] Date of Patent: Apr. 23, 1991

[54] METHOD OF FORMING LINES OF WEAKNESS IN OR GROOVING A PLASTIC MATERIAL, ESPECIALLY A PACKAGING MATERIAL

[75] Inventor: Gert J. Huizinga, Leeuwarden, Netherlands

[73] Assignee: LPF Verpakkingen B.V., Netherlands

[21] Appl. No.: 525,246

[22] Filed: May 17, 1990

[30] Foreign Application Priority Data

May 19, 1989 [NL] Netherlands .................. 8901257

[51] Int. Cl.⁵ ............................................. B23K 26/00
[52] U.S. Cl. ......................... 219/121.69; 219/121.61; 219/121.85
[58] Field of Search ................ 219/121.68, 121.69, 219/121.65, 121.66, 121.8, 121.82, 121.6, 121.85, 121.61

[56] References Cited

U.S. PATENT DOCUMENTS

| | | | |
|---|---|---|---|
| 3,560,291 | 2/1971 | Foglia et al. ................ | 156/229 |
| 3,626,143 | 12/1971 | Fry ............................ | 219/121.69 |
| 3,787,873 | 1/1974 | Sato et al. ................. | 219/121.69 X |
| 3,790,744 | 2/1974 | Bowen ....................... | 219/121.69 |
| 3,893,129 | 7/1975 | Endo et al. ................ | 346/77 |
| 3,909,582 | 9/1975 | Bowen ....................... | 219/121.69 |
| 3,974,016 | 8/1976 | Bondybey et al. .......... | 156/272 |
| 4,160,894 | 7/1979 | Stemmler et al. .......... | 219/121.6 |
| 4,307,282 | 12/1981 | Gappa ........................ | 219/121.68 |
| 4,537,809 | 8/1985 | Ang et al. .................. | 428/41 |
| 4,549,063 | 10/1985 | Ang et al. .................. | 219/121.69 |
| 4,740,163 | 4/1988 | Kuchenbecker ............ | 493/56 |
| 4,764,485 | 8/1988 | Loughran et al. .......... | 437/225 |
| 4,816,015 | 3/1989 | Holder et al. .............. | 493/355 |

FOREIGN PATENT DOCUMENTS

| | | |
|---|---|---|
| 0189909 | 8/1986 | European Pat. Off. . |
| 1479686 | 7/1969 | Fed. Rep. of Germany . |
| 3718402 | 12/1988 | Fed. Rep. of Germany . |
| 2161427A | 1/1986 | United Kingdom . |

*Primary Examiner*—C. L. Albritton
*Attorney, Agent, or Firm*—Peter L. Michaelson

[57] ABSTRACT

A method of forming lines of weakness in or grooving a plastic material, especially a packaging material, by local vaporization or degradation by means of a laser beam, which laser beam and which plastic or packaging material can be moved in relation to each other, wherein the laser beam is generated by means of a wavelength tunable laser tuned to a wavelength selected on the basis of the wavelength depending absorption spectrum of the material to be processed.

4 Claims, 5 Drawing Sheets

FIG. 2A

| | WAVELENGTH | | POWER WATT | EFF. % |
|---|---|---|---|---|
| LINE | mμ | cm$^{-1}$ | | |
| 10P46 | 10,885 | 918,72 | 9,5 | 16 |
| 44 | 10,860 | 920,83 | 18,0 | 30 |
| 42 | 10,835 | 922,92 | 26,0 | 43 |
| 40 | 10,811 | 924,97 | 30,0 | 50 |
| 38 | 10,787 | 927,01 | 34,5 | 57 |
| 36 | 10,764 | 929,02 | 38,0 | 63 |
| 34 | 10,741 | 931,00 | 40,0 | 67 |
| 32 | 10,719 | 932,95 | 42,0 | 70 |
| 30 | 10,696 | 934,90 | 45,0 | 75 |
| 28 | 10,675 | 936,80 | 46,5 | 77 |
| 26 | 10,635 | 938,69 | 48,0 | 80 |
| 24 | 10,632 | 940,55 | 48,0 | 80 |
| 22 | 10,611 | 942,38 | 49,0 | 82 |
| 20 | 10,591 | 944,19 | 51,0 | 85 |
| 18 | 10,571 | 945,98 | 49,0 | 82 |
| 16 | 10,551 | 947,74 | 47,5 | 79 |
| 14 | 10,532 | 949,48 | 47,0 | 79 |
| 12 | 10,513 | 951,19 | 45,0 | 75 |
| 10 | 10,494 | 952,88 | 41,0 | 69 |
| 8 | 10,476 | 954,55 | 36,0 | 60 |
| 6 | 10,458 | 956,19 | 22,0 | 37 |

FIG. 2B

ISOTOPE $C^{12}O_2^{16}$

| | WAVELENGTH | | POWER WATT | EFF. % |
|---|---|---|---|---|
| LINE | mμ | cm$^{-1}$ | | |
| 9P46 | 9,794 | 1021,06 | 13,5 | 22 |
| 44 | 9,773 | 1023,19 | 22,0 | 37 |
| 42 | 9,753 | 1025,30 | 29,0 | 48 |
| 40 | 9,733 | 1027,38 | 36,5 | 61 |
| 38 | 9,714 | 1029,44 | 38,0 | 63 |
| 36 | 9,695 | 1031,48 | 42,0 | 70 |
| 34 | 9,676 | 1033,49 | 44,0 | 73 |
| 32 | 9,657 | 1035,47 | 48,0 | 80 |
| 30 | 9,639 | 1037,43 | 50,0 | 83 |
| 28 | 9,621 | 1039,37 | 51,5 | 86 |
| 26 | 9,604 | 1041,28 | 53,0 | 88 |
| 24 | 9,586 | 1043,16 | 53,0 | 88 |
| 22 | 9,569 | 1045,02 | 53,0 | 88 |
| 20 | 9,552 | 1046,86 | 55,0 | 92 |
| 18 | 9,536 | 1048,66 | 56,0 | 93 |
| 16 | 9,519 | 1050,44 | 52,5 | 87 |
| 14 | 9,504 | 1052,20 | 48,5 | 81 |
| 12 | 9,488 | 1053,92 | 48,5 | 81 |
| 10 | 9,473 | 1055,63 | 42,0 | 70 |
| 8 | 9,458 | 1057,30 | 35,0 | 58 |
| 6 | 9,443 | 1058,95 | 10,5 | 18 |

FIG. 2C

ISOTOPE $C^{12}O_2^{16}$

| LINE | WAVELENGTH mμ | cm$^{-1}$ | POWER WATT | EFF. % |
|---|---|---|---|---|
| 10R4 | 10,365 | 964,77 | 8,0 | 13 |
| 6 | 10,349 | 966,25 | 29,0 | 49 |
| 8 | 10,334 | 967,71 | 37,5 | 62 |
| 10 | 10,318 | 969,14 | 43,0 | 71 |
| 12 | 10,303 | 970,55 | 47,0 | 79 |
| 14 | 10,289 | 971,93 | 49,0 | 81 |
| 16 | 10,274 | 973,29 | 50,0 | 83 |
| 18 | 10,261 | 974,62 | 50,5 | 84 |
| 20 | 10,247 | 975,93 | 50,0 | 83 |
| 22 | 10,233 | 977,21 | 50,5 | 84 |
| 24 | 10,220 | 978,47 | 50,5 | 84 |
| 26 | 10,207 | 979,71 | 50,5 | 84 |
| 28 | 10,195 | 980,91 | 48,0 | 80 |
| 30 | 10,182 | 982,10 | 45,5 | 75 |
| 32 | 10,170 | 983,25 | 43,5 | 72 |
| 34 | 10,159 | 984,38 | 41,0 | 69 |
| 36 | 10,147 | 985,49 | 37,0 | 61 |
| 38 | 10,136 | 986,57 | 33,0 | 55 |
| 40 | 10,125 | 987,62 | 27,0 | 45 |
| 42 | 10,115 | 988,65 | 19,5 | 32 |
| 44 | 10,105 | 989,65 | 11,0 | 19 |

FIG. 2D

| LINE | WAVELENGTH mμ | cm$^{-1}$ | POWER WATT | EFF. % |
|---|---|---|---|---|
| 9R4 | 9,367 | 1067,53 | 8,0 | 13 |
| 6 | 9,354 | 1069,01 | 28,0 | 47 |
| 8 | 9,342 | 1070,46 | 38,0 | 63 |
| 10 | 9,329 | 1071,88 | 45,0 | 75 |
| 12 | 9,317 | 1073,28 | 50,5 | 84 |
| 14 | 9,305 | 1074,65 | 54,0 | 90 |
| 16 | 9,294 | 1075,99 | 57,0 | 95 |
| 18 | 9,282 | 1077,30 | 58,0 | 97 |
| 20 | 9,271 | 1078,59 | 57,5 | 96 |
| 22 | 9,261 | 1079,85 | 57,5 | 96 |
| 24 | 9,249 | 1081,09 | 60,0 | 100 |
| 26 | 9,239 | 1082,30 | 54,0 | 90 |
| 28 | 9,229 | 1083,48 | 53,0 | 88 |
| 30 | 9,219 | 1084,64 | 48,5 | 81 |
| 32 | 9,210 | 1085,77 | 50,0 | 83 |
| 34 | 9,201 | 1086,87 | 46,0 | 77 |
| 36 | 9,192 | 1087,95 | 42,0 | 70 |
| 38 | 9,183 | 1089,00 | 35,0 | 58 |
| 40 | 9,174 | 1090,03 | 28,5 | 47 |
| 42 | 9,166 | 1091,03 | 15,5 | 26 |
| 44 | 9,157 | 1092,01 | 5,0 | 8 |

METHOD OF FORMING LINES OF WEAKNESS IN OR GROOVING A PLASTIC MATERIAL, ESPECIALLY A PACKAGING MATERIAL

This invention relates to a method of forming lines of weakness in a plastic material, especially a packaging material, by local vaporization or degradation by means of a laser beam, which laser beam and which plastic or packaging material can be moved in relation to each other. This method can also be used to groove a plastic material.

Such a method is known from U.S. Pat. No. 3,909,582. The laser beam is provided by a stationary $CO_2$ laser conventional for industrial applications, which $CO_2$ laser provides radiant energy at a constant wavelength of 10.6 microns. The packaging material is passed under the laser beam, with the rate of movement and consequently the processing speed being determined substantially by the radiation absorption capacity of the packaging material to be processed. This radiation absorption capacity is a property of materials which may have greatly varying values in different materials. A high absorption capacity means that the radiant energy supplied to the material is converted substantially into a weakening of materials by a form of energy effecting vaporization or degradation, e.g. heat. As a result, the processing speed of these materials is high. A low absorption capacity gives a low processing speed which in some packaging materials is so low that, in practice, it is difficult to form lines of weakness therein with the conventional $CO_2$ laser.

The object of this invention is to increase the processing speed of packaging materials or to enhance the processability of a series of materials that are difficult to weaken with a laser.

The method of the invention is characterized in that the laser beam is generated by means of a wavelength tunable laser tuned to a wavelength selected on the basis of the wavelength dependent absorption spectrum of the material to be processed. Preferably, the wavelength is selected in such a manner that the product of the laser efficiency and the absorption value of the packaging material is highest at that selected wavelength.

The method of the invention will hereinbelow be illustrated with reference to the drawings and examples. In the drawings:

FIG. 2 is the wavelength power table belonging to FIG. 1 for the $CO_2$ isotope $C^{12}O_2^{16}$;

WAVELENGTH TUNABLE $CO_2$ LASERS

Such lasers are known per se. To date, they are used for scientific research. The range of operation of this type of $CO_2$ laser is between the wavelengths of 8.9-11.4 microns. By, e.g., rotating a diffraction grating placed at the end of the laser tube, the laser can be tuned to a certain wavelength within the above-indicated range. Not all wavelengths give laser action, and the power supplied by the laser depends on the selected wavelength. For a conventional $CO_2$ isotope-$C^{12}O_2^{16}$, it was found that there were 80 transitions or wavelengths distributed over four ranges 9R, 9P, 10R and 10P (see FIG. 1) in which laser action occurs. The power supplied by the laser or the efficiency depends on the wavelength. Shown in Table I (FIG. 2) are for a 60 W $CO_2$ laser for the ranges 9R-10P the different transitions (column A) as well as the associate wavelengths in microns (column B), the reciprocal values thereof (column C), the power supplied (column D), and the efficiency (column E). As shown in Table I, the peaks of the ranges 9R, 9P, 10R and 10P are not at the same level, as shown in FIG. 1 for the sake of convenience.

Figure 1:
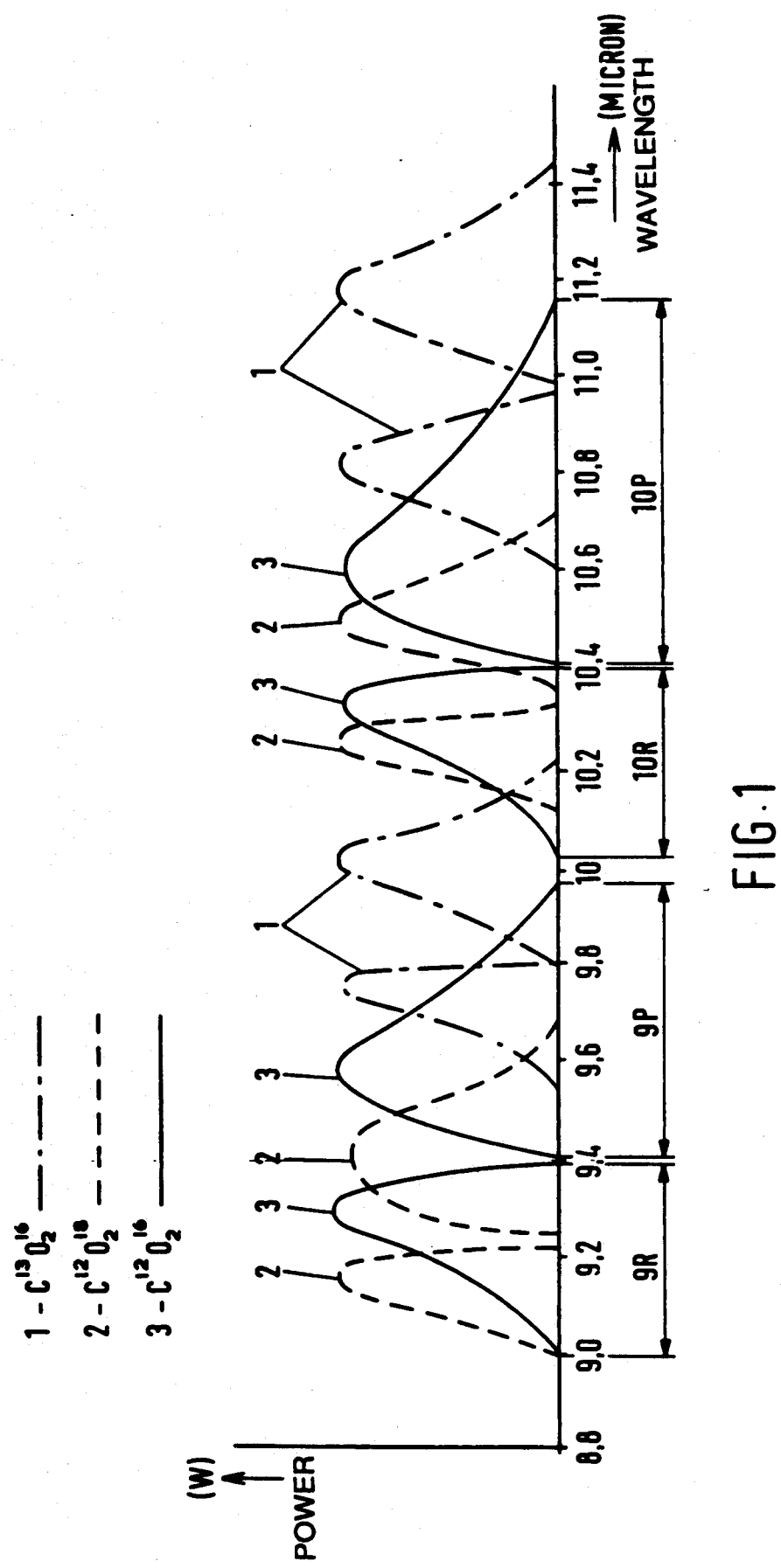
FIG. 1 is a graph in which the power supplied by a tunable $CO_2$ laser is plotted against the wavelength.

When the $CO_2$ laser is filled with another isotope, e.g., $C^{13}O_2^{16}$ or $C^{12}O_2^{18}$, there proves to be a shift of the ranges 9R-10P with laser action within the wavelength range 8.9-11.4 microns, as shown in FIG. 1. At a wavelength of 10.6 microns a $CO_2$ laser with isotope $C^{12}O_2^{16}$ is found to supply a maximum power, the laser action at that wavelength being low for the isotope $C^{12}O_2^{18}$ and even non-existent for the isotope $C^{13}O_2^{16}$.

Absorption capacity of packaging material

EXAMPLE I

U.S. Pat. No. 3,909,582 discloses that different packaging materials have absorption capacities different from each other for radiant energy having a wavelength of 10.6 microns. This absorption capacity is a measure of the processing speed when forming lines of weakness with a conventional untunable $CO_2$ laser (wavelength of 10.6 microns).

When packaging material is examined by means of an infrared spectrometer, the absorption capacity is found to depend strongly on the wavelength.

Figure 3:
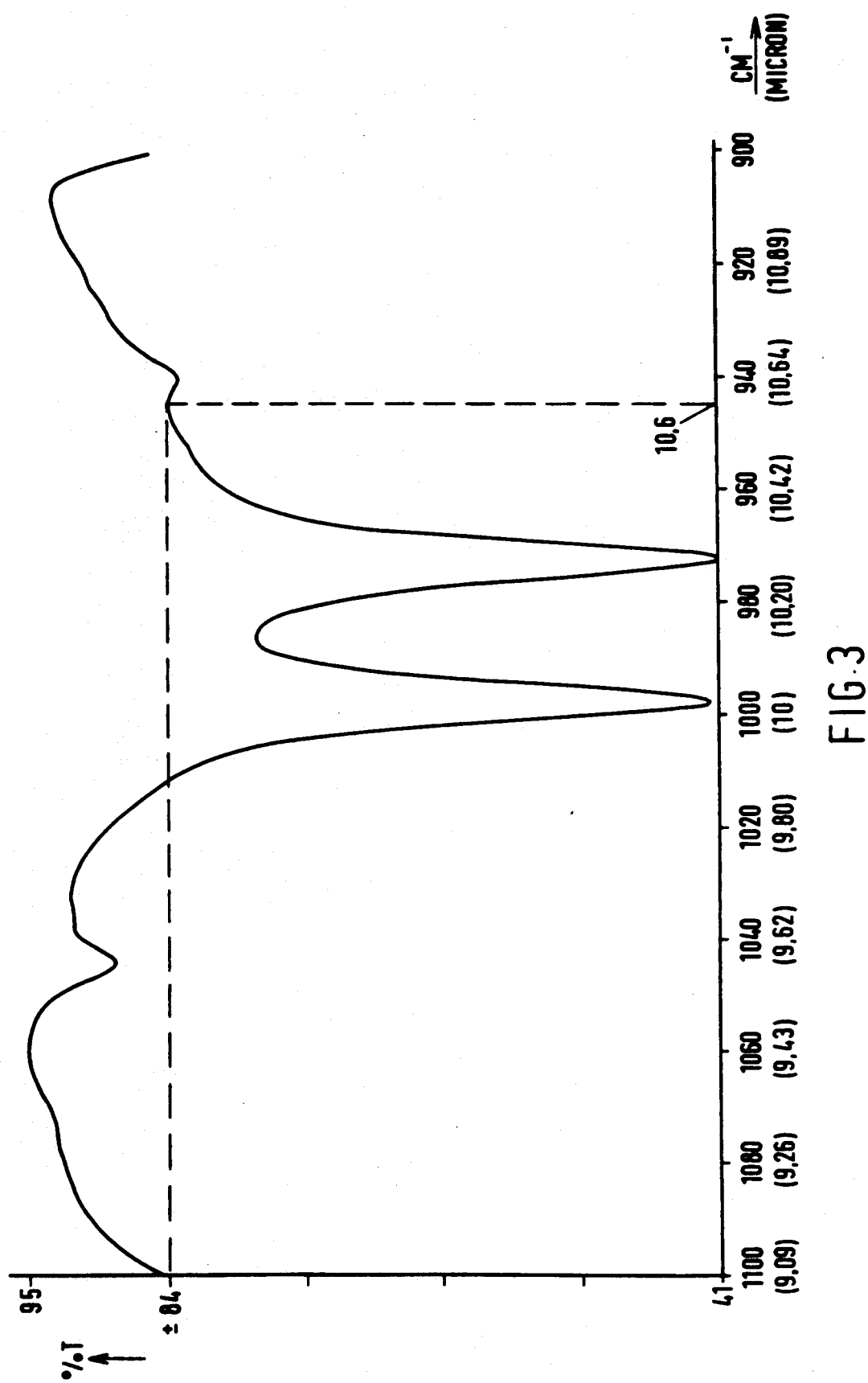
FIG. 3 is the transmission spectrum of a polypropylene film.

In FIG. 3 the curve of the transmission value (%) is plotted against the wavelength for a polypropylene film having a thickness of 20 microns. At the wavelength of 10.6 microns the transmission value is ±84%. Of the radiant energy supplied to the polypropylene film, 84% are found to pass through the material, only 16% of the energy supplied are partly reflected and partly absorbed in the polypropylene film. The amount of reflected energy can also be determined by means of an infrared spectrometer and varies within the wavelength range of 8.9-11.4 microns between 0 and 10%. Only ±11% of the energy supplied remains for absorption in the film. Consequently, the forming of lines of weakness in such a polypropylene film with a conventional $CO_2$ laser is a difficult and slow process.

The graph of FIG. 3 further shows two minima for the transmission value, namely 10.02 and 10.28 microns. The transmission value is then ±41% and the absorption value $100\% - (41\% + 5\%) = \pm 54\%$ or a factor of 5 greater than at the wavelength of 10.6 microns. If radiant energy having a wavelength of 10.02 or 10.28 microns is available, then the processability of the polypropylene film will be considerably increased.

FIG. 1 and Table 1 show that for the wavelength of 10.28 microns with a tunable $CO_2$ laser (isotope $C^{12}O_2^{16}$) a transition having a good efficiency (±85%) is available, but for the wavelength of 10.02 microns no laser action occurs, unless another gas fill (isotope $C^{13}O_2^{16}$) is selected.

EXAMPLE II

Figure 4:
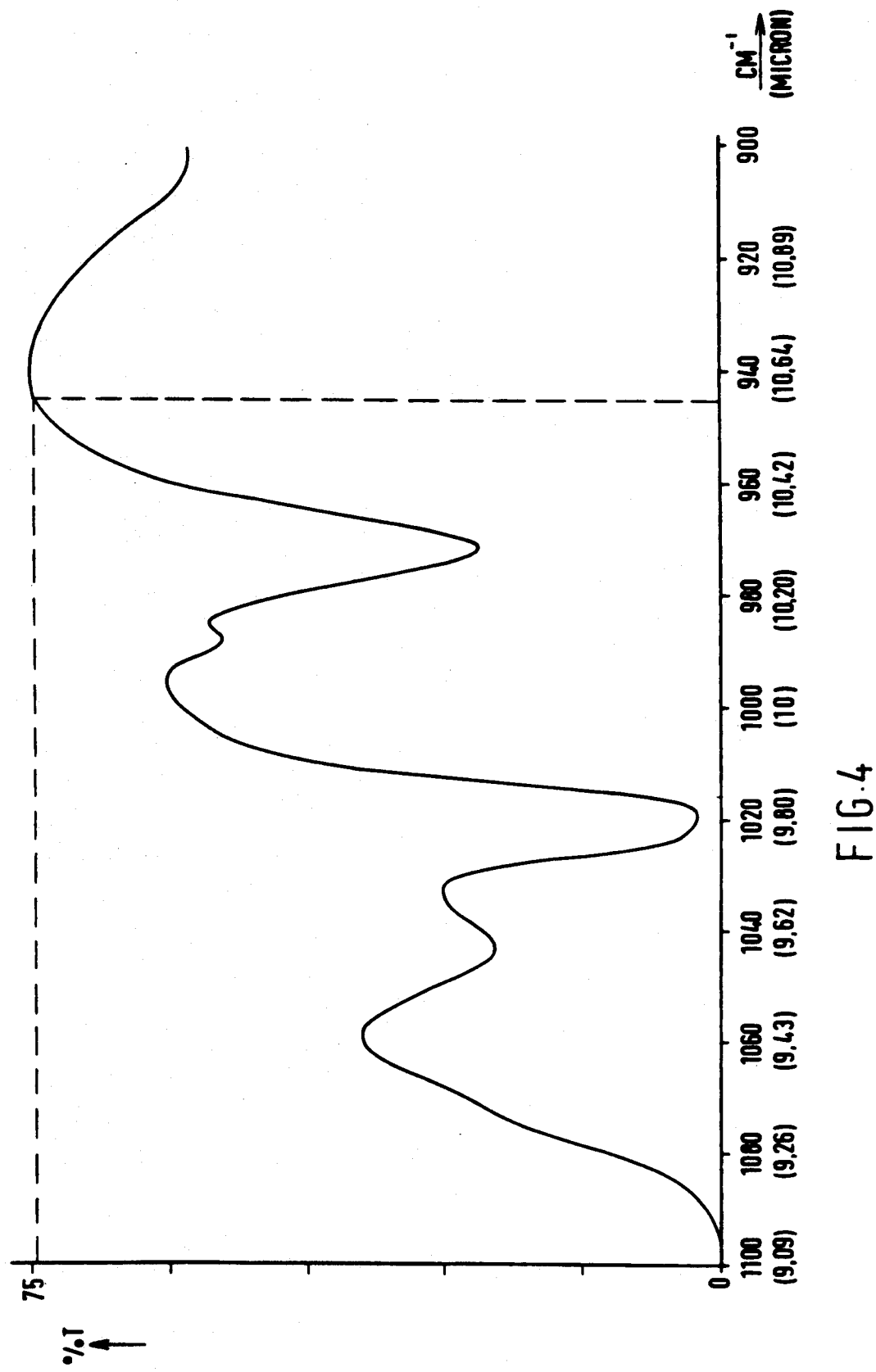
FIG. 4 is the transmission spectrum of a polyester film.

In FIG. 4 the curve of the transmission value (%) is plotted against the wavelength for a polyester film (PET=polyethylene terephthalate) having a thickness of 12 microns. At a wavelength of 10.6 microns the transmission value is ±75%, so the absorption value is low. The transmission value graph shows three minima, namely at 9.81, 10.29, and 9.2–9.3 microns. The Table (FIG. 2) shows that at the wavelength of 10.28 microns the laser can supply a power of 49 W. At the wavelength of 9.81 microns there is little or no laser action, while in the wavelength range of 9.2–9.3 microns several transitions can be selected with a high power supplied by the laser. Consequently, for processing the polyester film it is better to select the wavelength of 9.2–9.3 microns, because the product of laser efficiency×absorption value is higher at this wavelength than at the wavelength of 9.81 microns.

Examples I and II show what advantages can be obtained by using a tunable $CO_2$ laser to form lines of weakness in packaging materials in the form of a single film. Many packaging materials, however, are of complex composition and are composed of one or more layers of paper, cellophane, aluminium foil, polyethylene, polypropylene, cellulose triacetate, polyester, polyamides, PVC, PVDC, surlyn, polystyrene, with different layers being bonded together by means of adhesive, lacquer, plastic, wax, hot melt, and the like.

With these packaging materials of complex composition, the method of the invention offers the advantage that the tunable $CO_2$ laser is allowed to function at a wavelength at which one or more specific layers of the material are just vaporized or just not.

On the basis of this principle of just vaporizing or just not, tunable $CO_2$ and other types of lasers offer great advantages for the process of grooving signs in a coating applied to a carrier film. The laser is tuned to a wavelength at which the coating is processed but the carrier film is not affected.

The tunable $CO_2$ laser and also other tunable laser types offer great advantages for the process of grooving or applying marks in plastic products other than those in the form of a film which usually have a considerably greater thickness than the packaging materials in the form of a film. The absorption value of such products is usually 100% in view of their thickness, i.e. all the laser energy is absorbed in the product or, in other words, energy transmission takes place beyond the processing depth. With such products, not the wavelength dependent absorption value but the absorption value per unit of material thickness or the absorption constant (see U.S. Pat. No. 3,909,582—Table I) should be taken as the starting point. This absorption constant is usually wavelength dependent too. In that case the tunable $CO_2$ or another type of laser is tuned as described above to such a wavelength that the combination of laser efficiency and absorption constant is highest for obtaining a maximum processing speed.

I claim

1. A method of forming lines of weakness in or grooving a plastic material, especially a packaging material, by local vaporization or degradation by means of a laser beam, which laser beam and which plastic or packaging material can be moved in relation to each other, characterized in that the laser beam is generated by means of a wavelength tunable laser tuned to a wavelength selected on the basis of the wavelength depending absorption spectrum of the material to be processed.

2. A method of claim 1, characterized in that the laser is tuned to a wavelength at which the product of the laser efficiency and the absorption value of the packaging material is highest at that wavelength.

3. A method of claim 1 in which the packaging material is composed of different layers of a composite complex material, characterized in that the tunable laser is tuned to a wavelength having a low absorption value for that layer of the complex material which has to remain practically unaffected when other layers are weakened.

4. A grooving method of claim 3, characterized in that the complex material is composed of a carrier film and a coating applied thereto, the laser being tuned to a wavelength having a high absorption value for the coating and a low absorption value for the carrier film.

* * * * *